J. PATTEN.
ACID CONCENTRATING APPARATUS.
APPLICATION FILED NOV. 28, 1917.
1,286,188.
Patented Nov. 26, 1918.
4 SHEETS—SHEET 1.
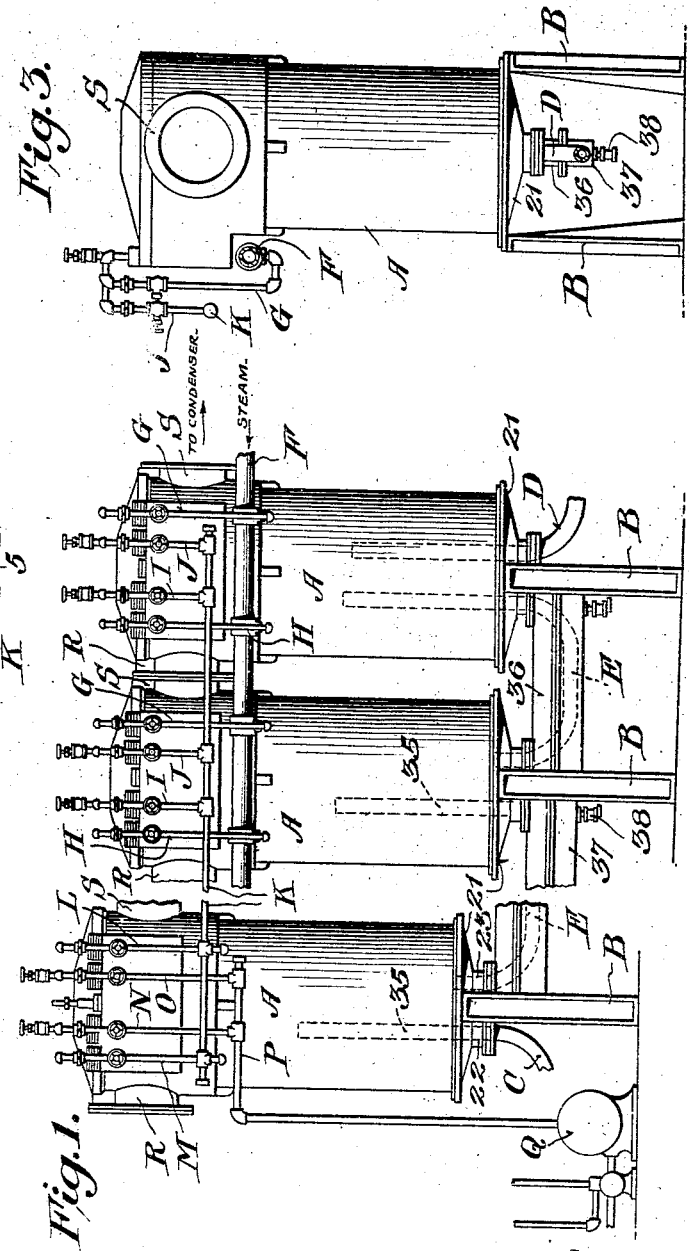
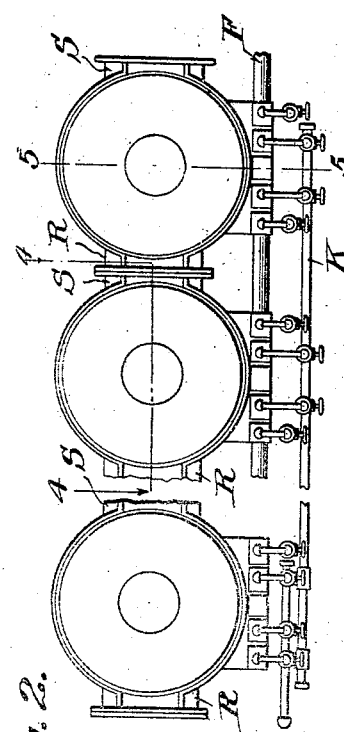
Witness
Chas. L. Griesbauer
Inventor
John Patten
By Foster Freeman Watson & Coit
Attorneys

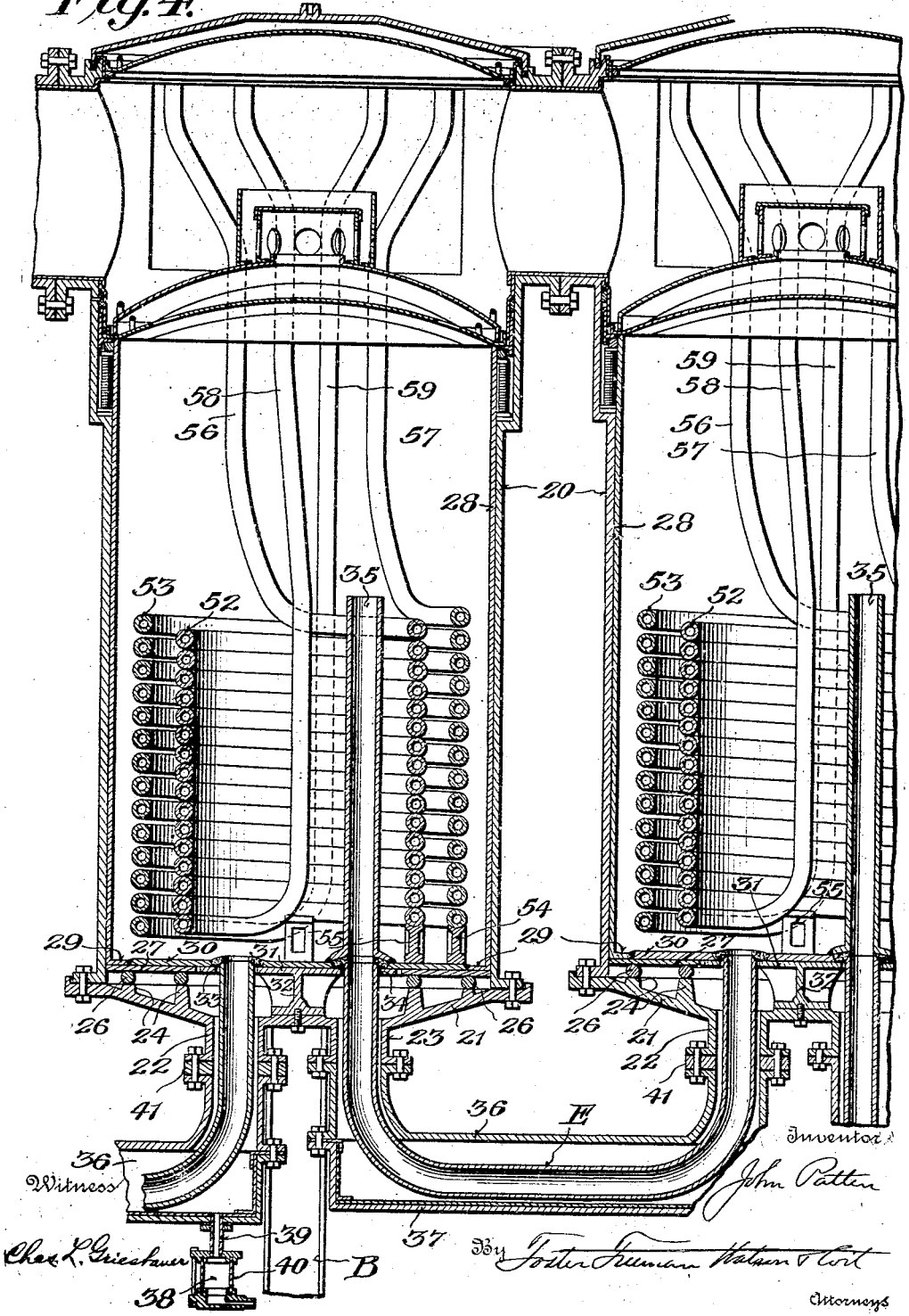

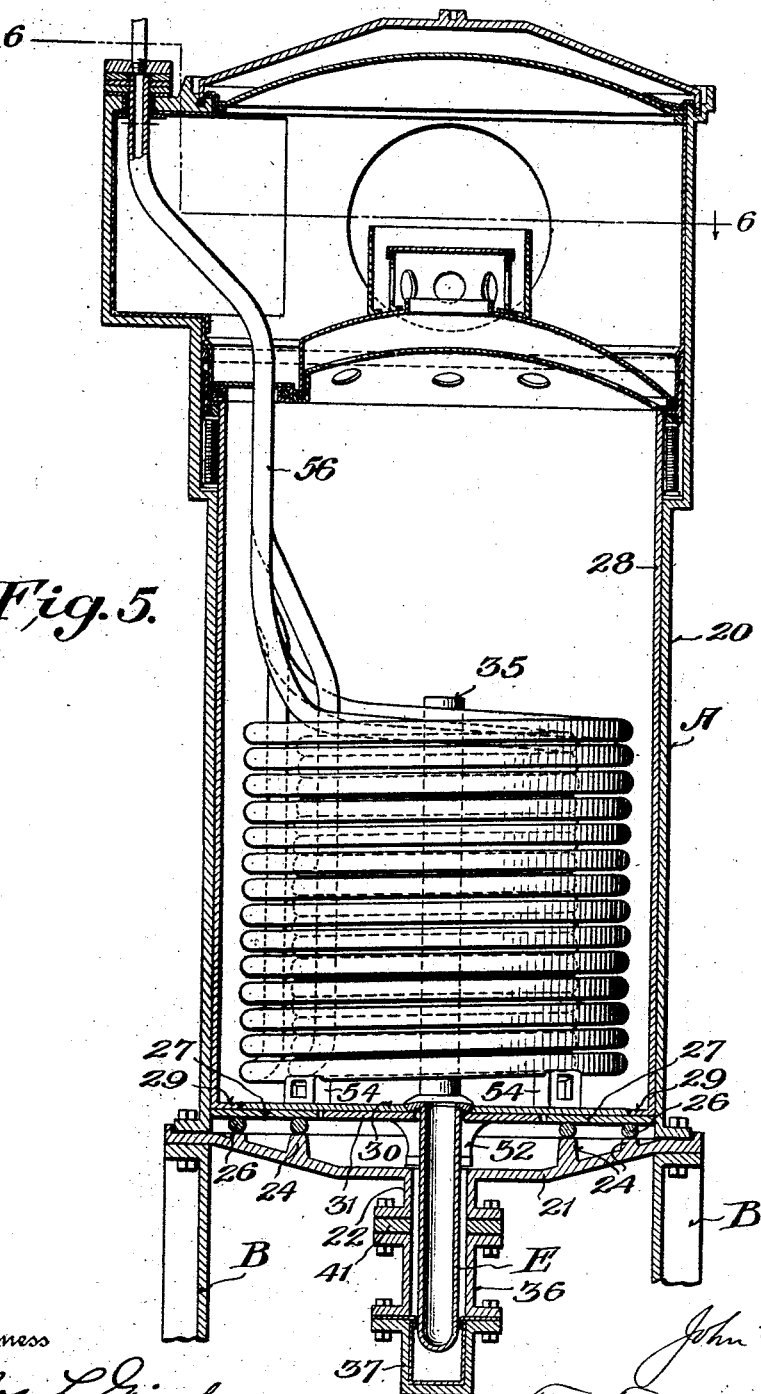

J. PATTEN.
ACID CONCENTRATING APPARATUS.
APPLICATION FILED NOV. 28, 1917.
1,286,188.
Patented Nov. 26, 1918.
4 SHEETS—SHEET 4.
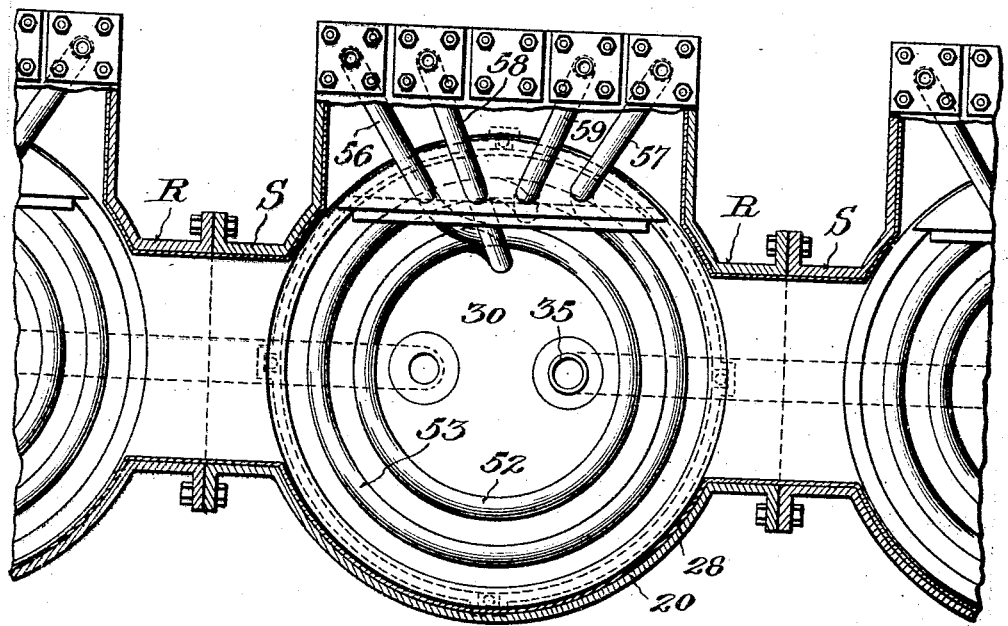
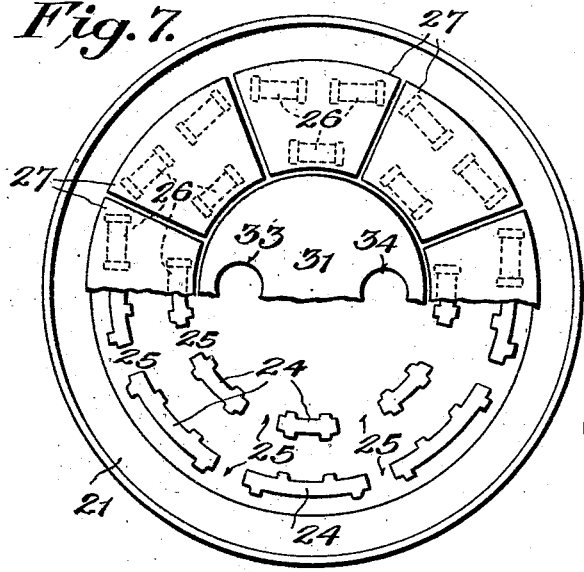
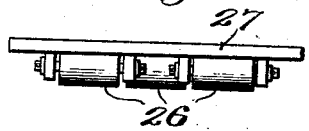
Witness
Chas. L. Griesbauer
Inventor
John Patten
By Foster Freeman Watson & Coit
Attorneys

UNITED STATES PATENT OFFICE.

JOHN PATTEN, OF BALTIMORE, MARYLAND.

ACID-CONCENTRATING APPARATUS.

1,286,188.  Specification of Letters Patent.  Patented Nov. 26.

Original application filed April 19, 1917. Serial No. 163,209. Divided and this application filed Novel 1917. Serial No. 204,441.

*To all whom it may concern:*

Be it known that I, JOHN PATTEN, a citizen of the United States, and residing at Baltimore, State of Maryland, have invented certain new and useful Improvements in Acid-Concentrating Apparatus, of which the following is a specification.

This application which is a division of my application #163,209, filed April 19, 1917, relates to acid concentrating apparatus and more particularly to such apparatus used for concentrating weak or dilute sulfuric acid which has absorbed water vapor in a vacuum ice making apparatus, and consists in certain radical improvements in an apparatus of this type described in my Patents Numbers 676,663 and 676,664.

The principal objects of the present invention are to provide an apparatus which will operate a maximum length of time before requiring repairs or adjustments and in which the interior parts are accessible for inspection and repairs merely by lifting off a few parts. In the above mentioned application the improvements in the upper parts of the apparatus have been claimed, the claims of this application being directed to the bottom structure, means for conducting the acid from one container to another and the means for draining the apparatus. The pipes for conducting the acid from one container to the next enter the containers at the bottom thereof and have well rounded bends therein so as to easily take up any expansion and contraction of parts. These pipes are surrounded and protected by casings which are carried by the inclined bottoms of the shells, thus affording a drain and means for collecting any acid leakage; and the bottom of the lead liner is flat and is supported so as to be maintained flat by a plurality of plates, some of which are movably mounted on rollers supported by the inclined or conical bottoms in spaced relation thereto so as to permit any acid leakage to drain to the low part of the bottom without coming in contact with the rollers. Other features of the invention will be apparent from the description taken in connection with the drawings in which:

Figure 1 is a side elevation of a portion of the acid concentrating apparatus shows a series of containers.

Fig. 2 is a plan view of the contai. shown in Fig. 1.

Fig. 3 is an end elevation of the right hand container shown in Fig. 1.

Fig. 4 is a sectional elevation of two containers intermediate the end container, parts of one of the containers being cut away, taken substantially on a longitudinal center line represented by the line 4—4 of Fig. 2 and looking in the direction indicated by the arrows.

Fig. 5 is a sectional elevation taken substantially on the line 5—5 of Fig. 2.

Fig. 6 is a sectional plan view taken substantially on the line 6—6 of Fig. 5.

Fig. 7 is a plan view of the supporting plates at the bottom of the shell, some of the plates being broken away in order to show the roller supporting lugs on the bottom.

Fig. 8 is a side elevation of one of the movable plates with the rollers attached thereto.

Before describing in detail the improvements which constitute this invention the general arrangement and organization of the apparatus will be briefly set forth. Referring to Figs. 1, 2 and 3, it will be observed that the apparatus consists essentially of a series of containers A which are each supported on uprights B. The elevation of the first or left hand container as viewed in Fig. 1 is the greatest, each of the containers toward the right being a little lower than its predecessor in order to cause a circulation of the acid from the left toward the right. The acid is fed to the first container through a pipe C and is withdrawn from the last container through a pipe D and is conducted from one container to the next by pipes E which will be described in detail hereinafter. Each of the containers has a heating coil arranged therein and the acid is maintained at such height that the coils are immersed therein. Steam for heating these coils is taken from the steam header F through the small pipes G and H and the steam and condensate are withdrawn from the coils through the small pipes I and J into a return condensed steam header K. Suitable valves are provided for controlling the circulation of the entering live steam and the returned steam and water. The first or left hand container is not supplied with live steam as are the others but the medium for heating the coils consists of the steam and water which is fed to the coils of this container through the small pipes L and M leading out of the condensed steam header K. The steam and water from the coils of the first container are withdrawn through the small pipes N and O to a header P which is connected with the receiver pump Q. The top portions of the containers are provided with diametrically oppositely arranged nozzles R and S which are adapted to be connected to corresponding nozzles on the adjacent containers, thus forming a vapor passage which is continuous through the tops of all the containers. The nozzle on the final container is adapted to be connected to a condenser or vacuum pump so that the interior of all the containers is maintained at as high a vacuum as is commercially practical. Thus the water vapor will be taken off at a relatively low temperature.

As shown in Figs. 4 and 5, the container is of a substantially cylindrical shape and has a shell portion 20 which is preferably made of cast iron. At its lower edge this shell portion 20 is flanged and carries an inclined bottom 21 which is of a general conical shape and is formed with a pair of nozzles 22 and 23 at the lower portion thereof. This bottom is provided with a plurality of circularly arranged series of upstanding lugs 24, the lugs in any one series being spaced circumferentially to provide passages 25 therebetween. The top surfaces of these lugs 24 are flush and are adapted to support rollers 26 carried by the sector plates 27.

The interior of the body portion of the shell 20 is protected by a lead lining 28. The bottom edges of this lining 28 are flanged inwardly as at 29 and are fused or burned to a flat bottom piece 30. This bottom of the liner 28 is flat and is adapted to be supported so that it will be maintained flat by a central circular plate 31 supported on the bottom 21 by means of the standard 32, and a series of sector plates 27 which are arranged around the central plate 31 with a slight clearance circumferentially between the plates and also with a radial clearance so that the plates can move slightly in a radial direction. These sector plates are supported so that their top surfaces are flush with the top surface of the central plate 31 by the rollers 26 which rest on the lugs 24 previously described. The central plate 31 is formed with two apertures 33 and 34, the aperture 33 being in line with the nozzle 22 and the aperture 34 being in line with the nozzle 23. A lead pipe E is fused to the bottom of the lead liner and extends through the aperture 33 down through the nozzle 22, then is formed with a well rounded bend, thence proceeds horizontally, then is bent to extend upwardly through the nozzle 23 of the next container through the aperture 34 and has its end fused to the bottom of the lead lining of the latter container. An upwardly projecting pipe 35 is fused to the top of the pipe E over the aperture 34 and projects vertically high enough so that the acid will be maintained in the container at a level sufficient to immerse the heating coils. The invention however is not limited to this particular means for maintaining the proper amount of acid in the container as obviously the parts may be disposed in a different manner to accomplish this purpose. The portions of the pipes E between the nozzles 22 and 23 are surrounded by a casing which may be made by the two sections 36 and 37. The section 36 is adapted to be joined to the nozzles 22 and 23 and the section 37 is fastened to the section 36 so that it may be removed to permit access to the pipe E. At one end the section 37, which in effect constitutes a trough, is provided with a receptacle 38 connected to the section 37 by a pipe 39. Thus acid which flows into the trough 37 will drain through the pipe 39 into a receptacle 38 which may be emptied as desired. In order to clearly indicate the amount of acid in the receptacle 38, the walls 40 may be glass if desired. As the left hand container as viewed in Fig. 4 is lower than the right hand container, a spacer 41 is inserted between the nozzle 22 and the connecting portion of the section 36 of the casing. It will be apparent from the above description that if any acid gets between the liner 28 and the shell 20 that it will flow downwardly and because of the inclined bottom 21 will pass down through the nozzles 22 and 23 and collect in the bottom sections 37 of the casing surrounding the pipes E. As the acid is liable to stand or collect in the sections 37, they may be protected by a lead lining 42. The other surfaces just mentioned being inclined or vertical, the acid flows over the same and does not remain long enough to cause any serious damage. The rollers 26 which support the movable sector plates 27 have been mounted on the lugs 24 so that they will not have any acid come in contact with them. It has been found that when the rollers rest on a bottom over which the acid flows that the sulfate of iron formed prevents the rollers from moving and in time, enough sulfate is formed so as to push the movable plates 27 upwardly and buckle the bottom of the lead liner. It will be obvious that because of the inclined bottom 21 and the method of mounting the rollers that this detrimental feature is overcome. Furthermore the bottom of the lead liner is supported so that it is flat and consequently there are no bending stresses set up in the same which take place when the support for the said bottom is not flat. By connecting the containers by a pipe joined to the bottom of the lead liners and having well rounded bends therein, the expansion and contraction of the containers and the pipe are taken up in the pipe without any injury whatever to the connections of the same with the lead lining. It will be very clear that this is a very important feature and that this construction overcomes the trouble which follows leaky joints in the pipes joining the containers. Moreover, the joining pipes E are surrounded by casings so that they are protected and at the same time these casings form collectors for the acid leakage.

As shown in the drawings, two heating coils 52 and 53 are mounted on supports 54 and 55 carried by the bottom of the liner, these supports being arranged so that they are directly over the sector plates 27. These coils have the inlet pipes 56 and 57 and the discharge or outlet pipes 58 and 59.

For a further description of the parts of the apparatus not claimed in this application reference may be had to the application referred to above.

In the operation of the apparatus, dilute acid is constantly fed through the pipe C into the first container A, in which it is subjected to the heat abstracted from the steam in the heating coils. As high a vacuum as is commercially practical is maintained in the containers so that the water is boiled off at a low temperature. A constant circulation of the acid through the containers is maintained and it is gradually concentrated in the successive containers and finally discharged through the pipe D after it has reached the proper concentration which is usually about 60 or 61 degrees Baumé.

The improvements herein described are very important from a practical standpoint. The provision of the U-shaped pipe E connecting the bottoms of the successive tanks permits relative expansion and contraction without in any way loosening or injuring the connection of the ends of this pipe and the respective container bottoms. The inclined iron bottom of the containers with the particular means for supporting and maintaining the bottom of the lead liners flat are very important features. In practice it is found practically impossible to prevent acid from getting in between the lead liners and the shell. The particular form of the bottom of the containers thus affords a very efficient means for draining acid which thus escapes and collecting it in the casings which surround the connector pipes E. Furthermore by maintaining the bottom supporting rollers 26 above the inclined surfaces of the container bottoms they are out of contact with any acid and are not subjected to the action of the same.

Although the improvements have been described specifically, it is obvious that the details thereof may be varied to considerable extent without departing from the spirit of the invention.

Having thus described the invention what is claimed and desired to be secured by Letters Patent is:

1. In an acid concentrating apparatus, a container having a lead lining the bottom of which is flat, means for supporting said bottom including a central plate and a series of sector plates arranged around the central plate, the top surfaces of all the plates being substantially flush and said sector plates being mounted for radial movement independently of the central plate.

2. In an acid concentrating apparatus, a container having a lead lining the bottom of which is flat, means for supporting said bottom including a rigidly mounted central circular plate and a series of sector plates arranged around the central plate, the top surfaces of all the plates being substantially flush and said sector plates being mounted for radial movement independently of the central plate.

3. In an acid concentrating apparatus, a container having a lead lining the bottom of which is flat, means for supporting said bottom including a central plate and a series of sector plates arranged around the central plate, the top surfaces of all the plates being substantially flush, and rollers for supporting said sector plates for radial movement independently of the central plate.

4. In an acid concentrating apparatus, a container having an inclined bottom adapted to drain from the outside of the container toward the center thereof, a lead lining in said container, means for supporting and maintaining the bottom of the lining flat including movable plates, rollers for supporting said plates, and means for supporting said rollers above and spaced from the inclined bottom.

5. In an acid concentrating apparatus, a container having an inclined bottom adapted to drain from the outside toward the center thereof, a lead lining in said container, means for supporting and maintaining the bottom of the lining flat including movable plates, rollers for supporting said plates, and means for supporting said rollers above and spaced from the inclined bottom, said means comprising spaced upstanding lugs carried by the latter.

6. In an acid concentrating apparatus, a cylindrical container having a bottom inclined to drain from the outside toward the center thereof, a plurality of circular series of upstanding lugs on said bottom, the lugs of each series being spaced circumferentially and the top surfaces of the lugs being substantially flush, rollers on said lugs, sector plates on said rollers, and a lead lining in said container having a flat bottom resting on said plates.

7. An acid concentrating apparatus comprising a plurality of containers, each container consisting of a shell having an inclined bottom provided with a nozzle at the low portion thereof, a lining for the shell having a flat bottom, a conduit connecting the bottom of the lining of one container with the bottom of the lining of the next container and passing through said nozzles, and a casing connected to said nozzles and surrounding said conduit and forming a drain for acid leakage.

8. An acid concentrating apparatus comprising a plurality of containers, each container consisting of a shell having an inclined bottom provided with a nozzle at the low portion thereof, a lining for the shell having a flat bottom, a conduit connecting the bottom of the lining of one container with the bottom of the lining of the next container and extending downward through one nozzle thence horizontally thence upward through the nozzle of the next container, and a casing spaced from and surrounding said conduit to protect the same and form a drain for acid leakage.

In testimony whereof I affix my signature.

JOHN PATTEN.